(12) United States Patent
Hamaguchi

(10) Patent No.: US 10,562,714 B2
(45) Date of Patent: Feb. 18, 2020

(54) ABNORMALITY DETECTION DEVICE FOR CONTAINER STACK

(71) Applicant: Daifuku Co., Ltd., Osaka-Shi, Osaka (JP)

(72) Inventor: Jun Hamaguchi, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 16/034,039

(22) Filed: Jul. 12, 2018

(65) Prior Publication Data

US 2018/0327192 A1 Nov. 15, 2018

Related U.S. Application Data

(63) Continuation of application No. PCT/JP2016/087044, filed on Dec. 13, 2016.

(30) Foreign Application Priority Data

Jan. 12, 2016 (JP) ................................. 2016-003254

(51) Int. Cl.
   B65G 43/00 (2006.01)
   B65G 1/00 (2006.01)
   B65G 43/08 (2006.01)
   B65G 57/00 (2006.01)

(52) U.S. Cl.
   CPC ............ *B65G 43/00* (2013.01); *B65G 43/08* (2013.01); *B65G 57/00* (2013.01); *B65G 2201/0235* (2013.01); *B65G 2203/0216* (2013.01); *B65G 2203/0225* (2013.01); *B65G 2203/0233* (2013.01)

(58) Field of Classification Search
   None
   See application file for complete search history.

(56) References Cited

U.S. PATENT DOCUMENTS

| 9,663,309 | B2 * | 5/2017 | Priebe | B65G 57/26 |
| 2008/0046115 | A1 * | 2/2008 | Tabellion | B65G 1/137 700/226 |
| 2016/0327383 | A1 * | 11/2016 | Becker | G01B 11/005 |

FOREIGN PATENT DOCUMENTS

| JP | H04338872 A | 11/1992 |
| JP | 2008156122 A | 7/2008 |
| JP | 2012192490 A | 10/2012 |
| JP | 2016210524 A | 12/2016 |

(Continued)

*Primary Examiner* — Kavel Singh
(74) *Attorney, Agent, or Firm* — St. Onge Steward Johnston & Reens LLC

(57) ABSTRACT

An abnormality detection device for a container stack determines stacking abnormality in a container stack on a conveyance path. A plurality of containers, each including a code display surface having container information recorded at a fixed position on a lateral outer surface thereof, are stacked with the code display surfaces positioned on the same side, thereby forming a container stack. A code reader that captures an image of the code display surface is arranged on a lateral side of the conveyance path, said conveyance path conveying the container stack with the code display surfaces oriented parallel to the conveyance direction. Read data from the code reader is input into a calculation processor that detects the position coordinate value of at least one fixed point on each of the code display surfaces and determines stacking abnormality in the container stack.

9 Claims, 9 Drawing Sheets

(56) References Cited

FOREIGN PATENT DOCUMENTS

| JP | 2016210525 A | 12/2016 |
| JP | 2016210526 A | 12/2016 |
| WO | 2006001237 A1 | 1/2006 |

* cited by examiner

|  | ABC001 | ABC002 | ABC003 | Y direction positional displacement amount |
|---|---|---|---|---|
| Point A coordinate value | X=213 Y=663 | X=777 Y=651 | X=1331 Y=639 | 12 |
| Point B coordinate value | X=216 Y=431 | X=779 Y=420 | X=1333 Y=411 | 9~11 |
| Point C coordinate value | X=448 Y=666 | X=1006 Y=653 | X=1547 Y=644 | 9~13 |
| Point D coordinate value | X=451 Y=433 | X=1008 Y=422 | X=1549 Y=416 | 6~11 |
| Y direction maximum positional displacement amount | 13 | | | |
| Inclination angle | θ=271 | θ=271 | θ=271 | |

|  | ABC001 | ABC002 | ABC003 | Y direction positional displacement amount |
|---|---|---|---|---|
| Point A coordinate value | X=211 Y=650 | X=777 Y=658 | X=1330 Y=673 | 8~15 |
| Point B coordinate value | X=214 Y=415 | X=779 Y=425 | X=1334 Y=443 | 10~18 |
| Point C coordinate value | X=447 Y=651 | X=1006 Y=658 | X=1548 Y=676 | 7~18 |
| Point D coordinate value | X=450 Y=416 | X=1008 Y=426 | X=1554 Y=449 | 10~23 |
| Y direction maximum positional displacement amount | | d=23 | | |
| Inclination angle | θ=271 | θ=271 | θ=271 | |

|  | ABC001 | ABC002 | ABC003 | Y direction positional displacement amount |
|---|---|---|---|---|
| Point A coordinate value | X=188  Y=607 | X=777  Y=655 | X=1331 Y=673 | 18~48 |
| Point B coordinate value | X=182  Y=374 | X=780  Y=424 | X=1334 Y=443 | 19~50 |
| Point C coordinate value | X=422  Y=602 | X=1006 Y=657 | X=1548 Y=675 | 18~55 |
| Point D coordinate value | X=417  Y=369 | X=1008 Y=426 | X=1551 Y=446 | 20~57 |
| Y direction maximum positional displacement amount | d=57 | | | |
| Inclination angle | $\theta=269$ | $\theta=271$ | $\theta=271$ | |

|  | ABC001 | ABC002 | ABC003 | Y direction positional displacement amount |
|---|---|---|---|---|
| Point A coordinate value | X=184 Y=643 | X=751 Y=624 | X=1331 Y=672 | 9~48 |
| Point B coordinate value | X=179 Y=407 | X=745 Y=392 | X=1334 Y=443 | 15~51 |
| Point C coordinate value | X=420 Y=636 | X=980 Y=619 | X=1547 Y=675 | 17~56 |
| Point D coordinate value | X=415 Y=401 | X=974 Y=386 | X=1550 Y=446 | 15~60 |
| Y direction maximum positional displacement amount | d=60 | | | |
| Inclination angle | $\theta$=269 | $\theta$=269 | $\theta$=271 | |

ABNORMALITY DETECTION DEVICE FOR CONTAINER STACK

FIELD OF THE INVENTION

The present invention relates to an abnormality detection device for a container stack for checking, when stackable containers are conveyed on a conveyance path, whether the respective containers are properly stacked.

BACKGROUND OF THE INVENTION

Stackable containers are conveyed in a state where a required number thereof are stacked, and when the containers are stored in a storage area of a conveyance destination of the container stack, for example, in a storage area where the containers are directly placed on a floor surface, it is effective to significantly enhance the floor surface utilization efficiency in a case where the containers are placed on the floor one by one. Also, when the containers are retrieved, since a plurality of containers stacked can be integrally retrieved as they are, a retrieval operation can be performed efficiently. As a matter of course, in the storage area for the container stack described above, an automatic storage/retrieval device for a container stack is equipped in which in a conveyance carriage capable of being moved horizontally at a constant height above the floor surface in an X-Y arbitrary direction, a transfer device capable of raising and lowering the container stack by gripping it laterally is provided. Although a patent literature disclosing this background art cannot be explicitly indicated, the present applicant has disclosed, in Japanese Patent Application Nos. 2015-92812 to 2015-92814 which are previous applications, the technical content in which the container stack described above is conveyed to and stored in the storage area.

SUMMARY OF THE INVENTION

In the conveyance of containers while they are stacked in the above-described container storage area where the automatic storage/retrieval device for a container stack is provided, in the storage place of the container storage area, it is no longer necessary to stack a plurality of containers to be stored such as by a manual operation, it is therefore possible to efficiently perform a storage operation in the container storage area. However, as a precondition therefor, the container stack which is conveyed needs to be in a state where the upper and lower containers are properly stacked without being displaced in a horizontally lateral direction. If the upper and lower containers are displaced in the horizontally lateral direction beyond an allowable range, it is also likely that at the conveyance destination thereof, the container stack cannot be reliably gripped and conveyed by the automatic storage/retrieval device. In particular, in a case where the container includes a fitting protrusion bottom portion which is fitted, at the time of stacking, to an upper end concave recessed portion of the lower container (the upper end concave recessed portion also includes an upper end opening portion of the container, a rectangular concave recessed portion formed in a lid plate which is fitted to the upper end opening portion in an attachable/detachable manner, or a rectangular concave recessed portion formed in a top plate portion of the container), there is also a case where the fitting protrusion bottom portion of the upper container is not properly fitted into the upper end concave recessed portion of the lower container, and thus the containers are displaced in a conveyance direction in a state where the upper container is inclined with respect to the lower container. However, in such a case, if the container stack can be lowered to an intended place with the automatic storage/retrieval device, since the uppermost container in the container stack is inclined, in a case where another container is transferred on the previously placed container stack, it is also likely that the transfer process cannot be performed reliably and safely. Therefore, if, in a stage where the container stack is conveyed on the conveyance path, the container stack in which stacking is not properly performed can be detected automatically and reliably, the abnormal container stack is automatically sorted so as not to be fed into the container storage area and/or the abnormal container stack is corrected into a proper stacked state such as by a manual operation while the abnormal container stack is on the conveyance path, it is thereby possible to avoid an inconvenient situation expected on the side of the container storage area. However, a practical means which can solve such a problem has not been conceived.

The present invention proposes an abnormality detection device for a container stack which can solve the conventional problem as described above, and for ease of understanding of a relationship with an embodiment which will be described later, the abnormality detection device for a container stack according to the present invention will be shown with reference signs which are used in the description of the embodiment and which are placed in parentheses. In the abnormality detection device for a container stack, in the container stack (8), a plurality of containers (1) where a code display surface (6) recording container information is provided in a fixed position on a lateral outer surface of the stackable container (1) are stacked such that the code display surfaces (6) are positioned on the same side, and a code reading means (12) which captures images of the code display surfaces (6) on the respective containers (1) in the container stack (8) is arranged beside a conveyance path (10) where the container stack (8) is conveyed with the code display surfaces (6) oriented parallel to a conveyance direction, a calculation processing means (18) is additionally provided to which read data from the code reading means (12) is input, the calculation processing means (18) detects, from the read data of each of the code display surfaces (6), a position coordinate value of at least one fixed point (at least one of points A to D) in each of the code display surfaces (6), and the stacking abnormality in the container stack (8) is determined from the position coordinate value in each of the containers (1).

That is, when stacking is proper, since the code display surfaces on all the containers stacked are aligned in a vertical direction while they are parallel to each other, one fixed point in the respective code display surfaces is also aligned on an imaginary vertical line. However, when, among the containers stacked, there is a container which is displaced in the conveyance direction, the fixed points of the code display surfaces in the respective containers are not aligned on the imaginary vertical line passing through the fixed point in the lowermost container. In addition, as described previously, there is also a case where the container includes a fitting protrusion bottom portion (4), the fitting protrusion bottom portion (4) of the upper container is not properly fitted into an upper end opening portion (5) in the lower container, and thus the upper container is displayed in the conveyance direction in a state where the upper container is inclined with respect to the lower container. However, in such a case, not only are the fixed points of the code display surfaces in the respective containers not aligned on the imaginary vertical line passing through the fixed point in the lowermost container but also the interval between the fixed points of the respective containers is varied. The variation in the position of the fixed points described above is detected by processing the read data from the code reading means with the calculation processing means, and thus it is possible to determine the stacking abnormality.

In a large number of stackable containers used in a factory or the like, for the management of the containers themselves, the inventory management of stored items and the like, in general, a code recording container information such as the specific number of each container, that is, a code display surface such as a one-dimensional barcode or a two-dimensional matrix barcode is provided in a fixed position on a lateral outer surface. According to the configuration of the present invention described above, the code display surface which is generally provided in the fixed position on the lateral outer surface of the stackable container and the code reading means which is used to read the container information from the code display surface are utilized as they are, and it is thereby possible to automatically determine whether the stacked state of the container stack on the conveyance path is proper or abnormal. Therefore, when the stacked state is determined to be abnormal, for example, the container stack is removed from the top of the conveyance path either manually or with an automatic machine or the subsequent path switching means is automatically switched such that the abnormal container stack is fed into another collection place, etc., it is thereby possible to cut off the supply to the storage area as described above. Therefore, as compared with a case where a dedicated system is built which captures an image of the entire container stack so as to determine, from the image, whether the stacked state is proper or abnormal, with a system which utilizes the generally used devices and which can be implemented relatively inexpensively, it is possible to accurately determine the container stack in which the stacked state is abnormal and thereby can perform necessary measures.

In a case where the present invention is implemented, specifically, the calculation processing means (18) can be configured such that the calculation processing means (18) calculates, from the position coordinate value of the one fixed point (one of the points A to D) in the code display surface (6) in each of the containers (1), a positional displacement amount between the respective containers (1) in the conveyance direction, calculates whether or not the positional displacement amount falls within an allowable range, and determines the stacking abnormality when the positional displacement amount exceeds the allowable range. In addition, as described previously, also for the abnormal stacked state where the upper container is inclined with respect to the lower container caused by a case where the container includes the fitting protrusion bottom portion, the calculation processing means (18) can also be configured such that the calculation processing means (18) calculates, from the position coordinate values of two fixed points (two of the points A to D) in the code display surface (6) in each of the containers (1), an inclination angle of each of the containers (1) with respect to the conveyance direction, calculates, from the inclination angle of each of the containers (1), an inclination angle displacement amount between the respective containers (1), and determines the stacking abnormality when the inclination angle displacement amount exceeds an allowable range. In particular, even in a situation where it is difficult to accurately acquire a small angle variation with the latter method for acquiring an angle variation because in the method, the position coordinate values of the two fixed points are converted into the inclination angle, according to the former method for detecting the displacement of one fixed point, the method compares the position coordinate value of the one fixed point itself, therefore, it is possible to accurately acquire even a small angle variation in the containers, and it is thereby possible to highly precisely implement the present invention.

In addition, when it is implemented such that, from the read data of the code display surface (6) whose image is captured by the code reading means (12), a corner of the code display surface (6) is set to the fixed point and the position coordinate value thereof is detected, it is not necessary to newly display a detection fixed point on the inner side or the outer side of the code display surface, and thus the code display surface recording the container information can be utilized as it is, with the result that the implementation of the present invention is more easily facilitated.

Although the reading of the code display surface (6) in the container stack (8) can be performed for the container stack (8) that is being moved on the conveyance path (10), with a configuration in which the container stack (8) which is conveyed on the conveyance path (10) is temporarily stopped in a position in which all the code display surfaces (6) in the container stack (8) are present within an image capturing area (15*a*) of the code reading means (12), and for the container stack (8) in a stopped state, the images of the code display surfaces (6) are captured by the code reading means (12), the correct reading can be easily realized.

Furthermore, the code reading means (12) can be configured such that the code reading means (12) is formed by providing code readers (15) capable of reading the code display surface (6) of one container (1) or the code display surfaces (6) of a plurality of the containers (1) stacked in a plurality of vertical stages. According to this configuration, even in a case where the height of one container is great or a large number of containers are stacked and the height of the image capturing area of the code reading means needs to be increased, the image capturing areas of the respective code readers in a plurality of vertical stages are collected in the height direction, and thus the height of the image capturing area in the entire code reading means can be made sufficiently high enough, therefore, as compared with a case where the code reading means is positioned laterally far away from the conveyance path for the container stack to increase the height of the image capturing area, the position of the fixed point can be highly precisely detected without the resolution being lowered.

DETAILED DESCRIPTION OF THE INVENTION

Figure 1A:
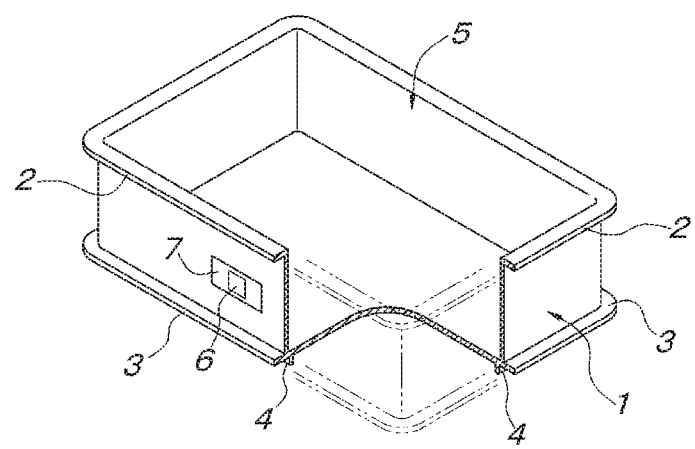
FIG. 1A is a partially cutout perspective view showing a stackable container.

As shown in FIG. 1A, a stackable container 1 is a box-shaped container whose planar shape is rectangular and which is made of a synthetic resin, and includes an upper flange portion 2 which is projected from an upper end entire periphery laterally outward and horizontally, a lower flange portion 3 which is projected from a lower end entire periphery laterally outward and horizontally, and a fitting protrusion bottom portion 4 formed by a rib which is provided so as to protrude in the shape of a rectangular frame from a bottom surface flush with the lower surface of the lower flange portion 3. When the same containers 1 are stacked, the fitting protrusion bottom portion 4 of the upper container 1 can be fitted into a rectangular opening portion 5 surrounded by the upper flange portion 2 of the lower container. A label 7 on which a code display surface 6 is printed is stuck to the outer surface of one side wall portion 1a parallel to the longitudinal direction of the container 1 among the four side wall portions of the container 1.

A code displayed on the code display surface 6 is used for recording container specific information such as the specific number, the size and the like of the container 1, and in the illustrated embodiment, a substantially square two-dimensional matrix code is shown, however, a strip-shaped one-dimensional barcode or the like may be used. The label 7 on which the code display surface 6 is printed is stuck such that both the upper and lower sides of the quadrilateral code display surface 6 are parallel to both the upper and lower flange portions 2 and 3 of the container 1 and that the code display surface 6 is correctly positioned at a fixed position in a center portion on the side wall portion 1a of the container 1.

Figure 1B:
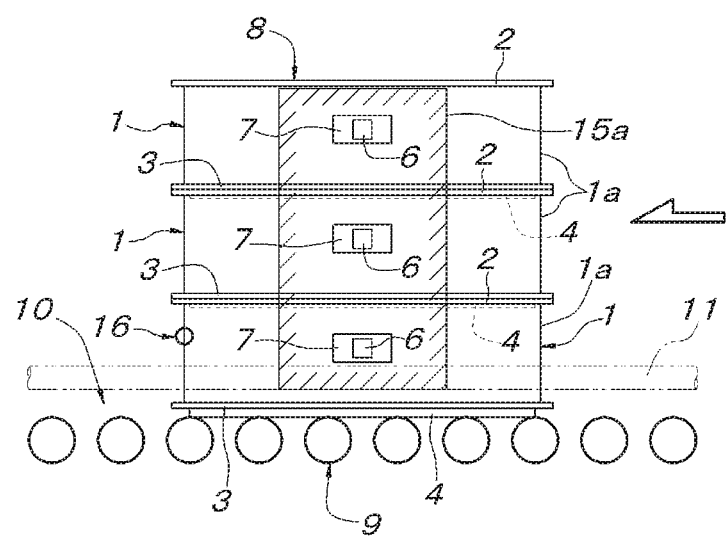
FIG. 1B is a side view showing a state where a container stack on a conveyance path is in a fixed stop position.
Figure 2A:
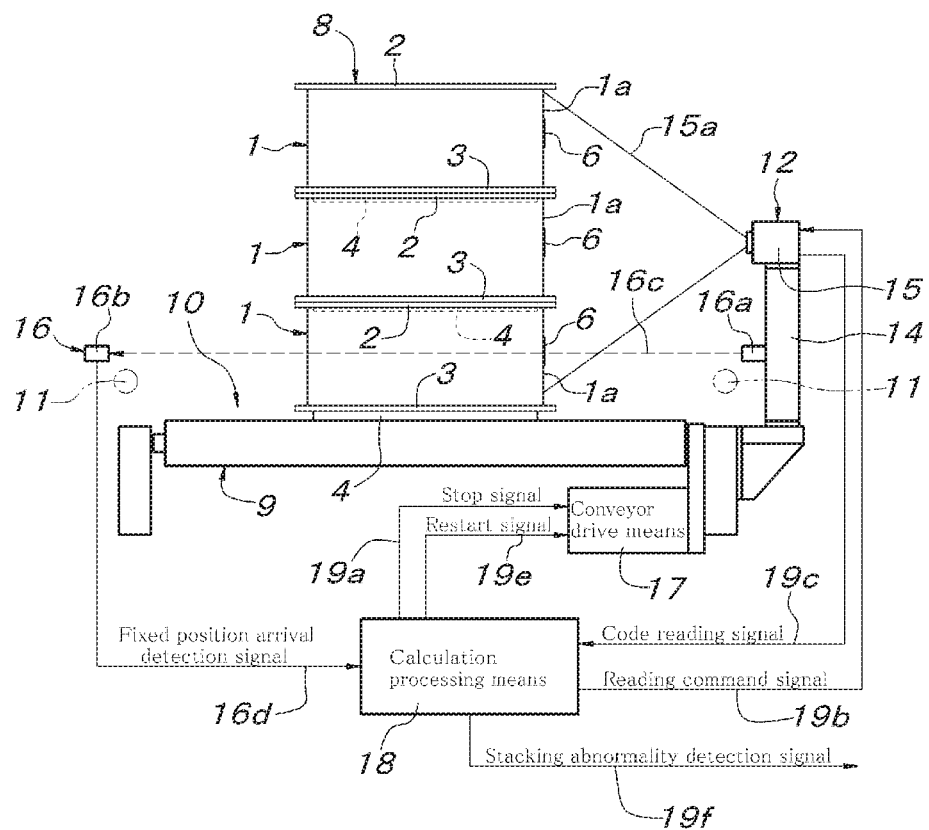
FIG. 2A is a front view illustrating the container stack shown in FIG. 1B, a code reading means and a control system.

As shown in FIGS. 1B and 2A, a required number of (in the illustrated example, three) containers 1 are stacked as described above while they are oriented such that the side wall portions 1a to which the labels 7 are stuck are positioned on the same side to form one container stack 8, and the container stack 8 is conveyed on a conveyance path 10 formed with, for example, a roller conveyor 9. The container stack 8 on the conveyance path 10 is conveyed toward, for example, the storage area as described previously in a state where the side wall portions 1a of the containers 1 to which the labels 7 are stuck face to the lateral side of the conveyance path 10. Reference sign 11 denotes a container guide which is laid on both the left and right sides of the conveyance path 10 parallel to the conveyance direction.

As shown in FIG. 2A, partway through the conveyance path 10, a fixed stop position 13 for the container stack 8 including a code reading means 12 is set. The code reading means 12 is formed with one code reader 15 which is supported by a support member 14 provided so as to stand beside the conveyance path 10, and has, as shown in FIG. 1B, a vertically long rectangular image capturing area 15a where images of all the code display surfaces 6 (in the illustrated example, the three code display surfaces 6) on a plurality of vertical stages in the container stack 8 which is stopped at the fixed stop position 13 can be captured simultaneously. In the fixed stop position 13, a sensor 16 is arranged which detects, for example, the front side of the container stack 8 when the container stack 8 arrives at the fixed stop position 13. The illustrated sensor 16 is, for example, a transmission-type optical sensor which outputs a fixed position arrival detection signal 16d for the container stack 8 when the front side of the container stack 8 interrupts an optical axis 16c between a light projector 16a and a light receiver 16b, however, an optical sensor, such as a reflection-type optical sensor, which may be of any configuration may be adopted.

Figure 9:
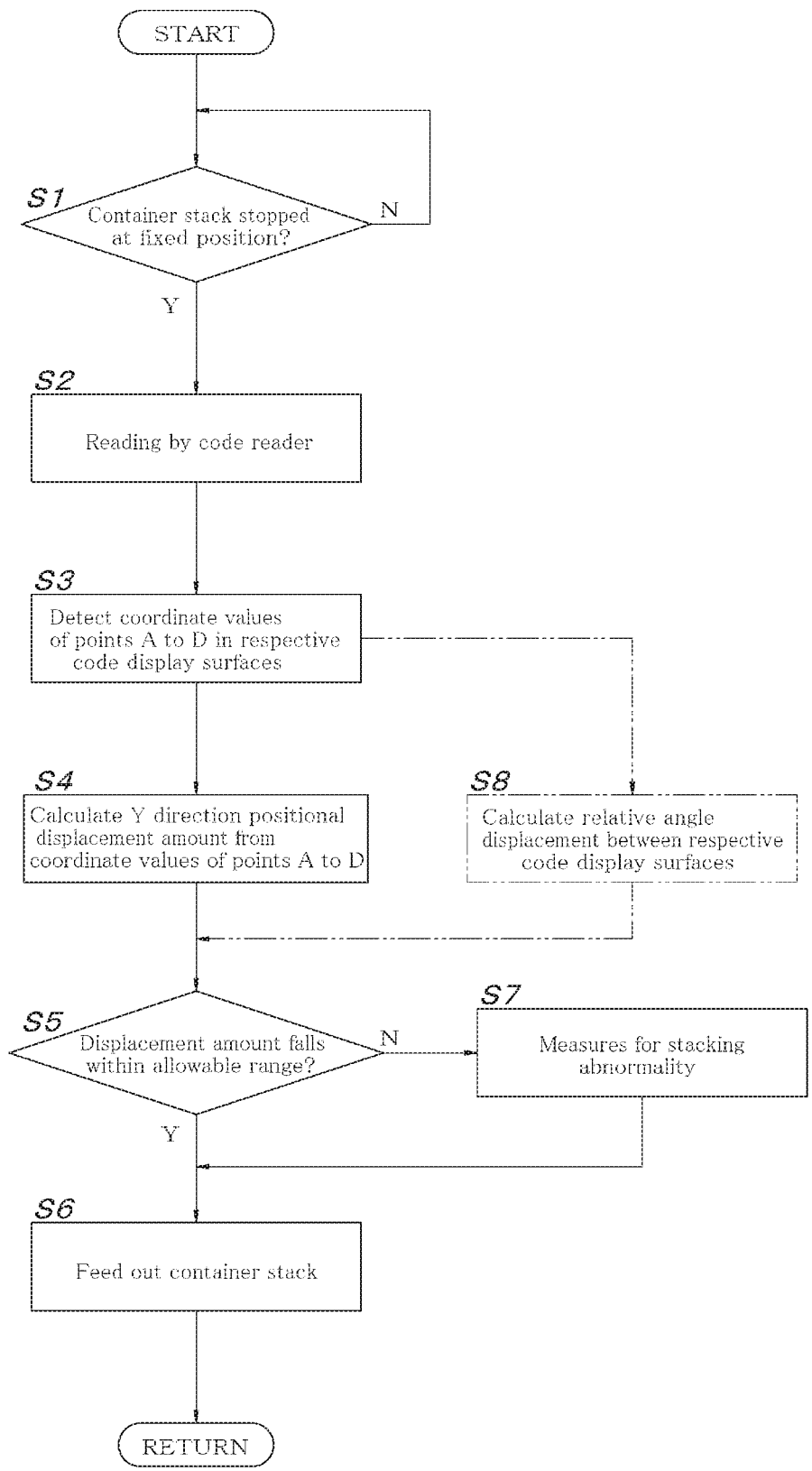
FIG. 9 is a flowchart illustrating a control procedure.

As shown in FIG. 2A, a drive means 17 for the roller conveyor 9, the code reading means 12 (code reader 15), and the sensor 16 are connected to a calculation processing means 18, and control shown in the flowchart of FIG. 9 is performed by the calculation processing means 18. That is, when the fixed position arrival detection signal 16d for the container stack 8 is output from the sensor 16, the calculation processing means 18 outputs a stop signal 19a to the drive means 17 of the roller conveyor 9, the roller conveyor 9 is automatically stopped, and thus the container stack 8 is stopped at the fixed stop position 13 (step S1 in the flowchart of FIG. 9). According to the stop of the container stack 8 at the fixed stop position 13, the calculation processing means 18 outputs a reading command signal 19b to the code reader 15, the reading of the respective code display surfaces 6 on the container stack 8 stopped at the fixed stop position 13 is performed by the code reader 15 (step S2 in the flowchart of FIG. 9), and the code reader 15 transmits a code reading signal 19c to the calculation processing means 18.

As shown in FIGS. 3 and 4, the image capturing area 15a of the code reader 15 needs to be vertically long rectangular, however, in general, when the image capturing area of the code reader 15 is brought into an upright position, the image capturing area of the code reader 15 is laterally long rectangular. In such a case, it suffices to install the code reader 15 by rotating it 90 degrees such that the image capturing area 15a is vertically long rectangular. In this embodiment, the code reader 15 which has a camera resolution of vertically 1200×laterally 1600 (pixel/inch) is rotated 90 degrees so as to form the code reading means 12. Therefore, the code reading signal 19c transmitted from the code reader 15 to the calculation processing means 18 is image data obtained by capturing, into one image, the three code display surfaces 6 aligned in an up/down direction of the container stack 8, and the image data is analyzed by the calculation processing means 18.

Figure 3A:
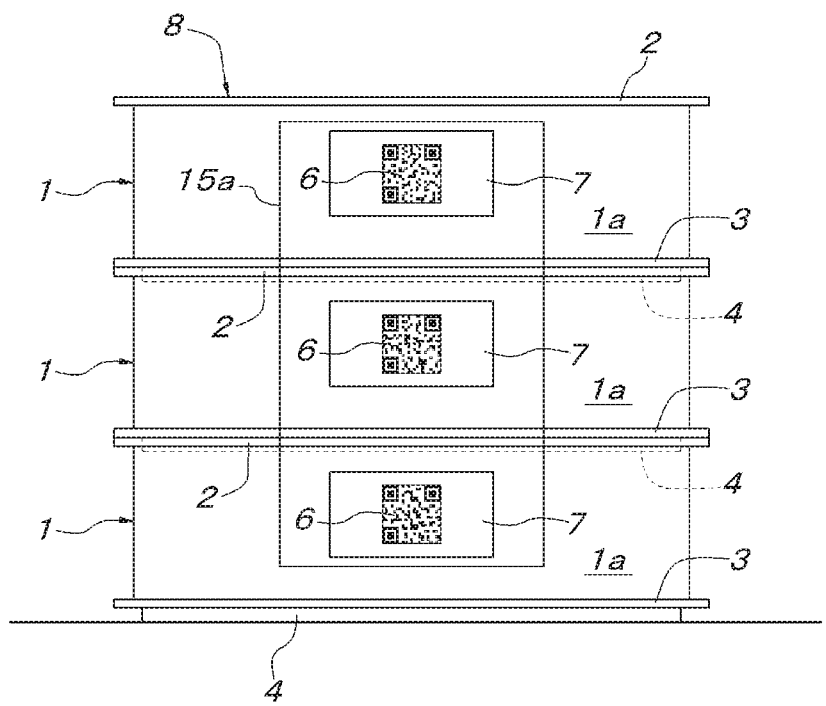
FIG. 3A is a side view showing code display surfaces to be read and an image capturing area in the container stack.
Figure 3B:
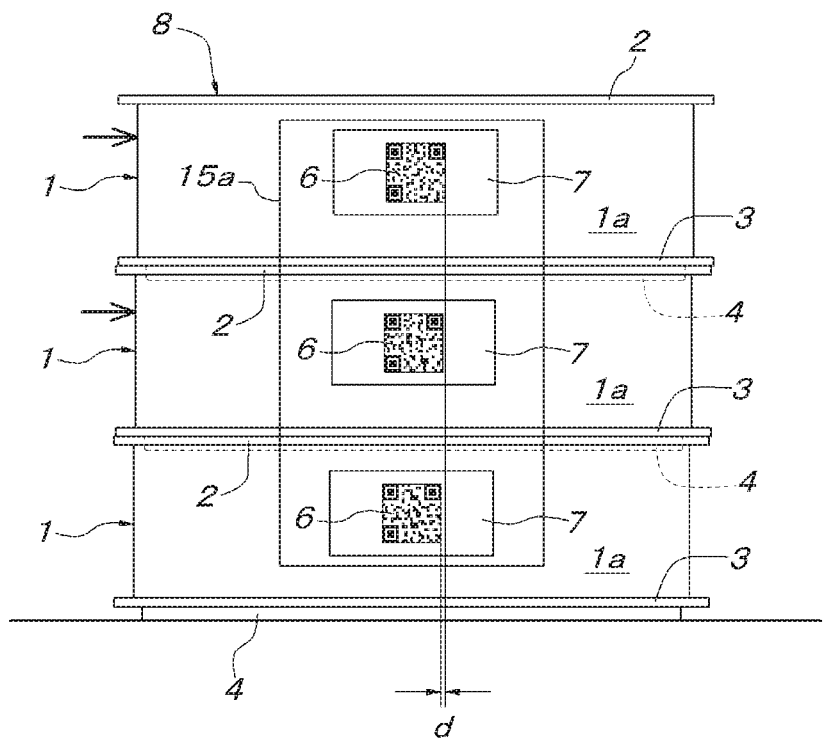
FIG. 3B is a side view showing a state where the respective containers in the container stack shown in FIG. 3A are relatively moved in a conveyance direction (Y direction).

In the following description, the uppermost container of the container stack 8 is represented by 1a, the middle container is represented by 1b and the lowermost container is represented by 1c. FIG. 3A shows the container stack 8 in a properly stacked state where the middle and uppermost containers 1b and 1a are properly fitted to the lower containers 1b and 1c, respectively. Therefore, in the fitting portions of the upper end opening portions 5 and the fitting protrusion bottom portions 4 in the respective containers 1a to 1c, play in a horizontal two-dimensional direction is acquired to allow the smooth fitting/release between the containers, and FIG. 3B shows a state where, in the container stack 8 shown in FIG. 3A, the middle and uppermost containers 1b and 1a are respectively moved most laterally in a Y direction parallel to the conveyance direction with respect to their lower containers 1b and 1c within the range of the play. The state shown in FIG. 3B is within the range of the properly stacked state in the container stack 8. In the container stack 8 shown in FIG. 4A, the uppermost container 1a is displaced with respect to the middle container 1b in the Y direction parallel to the conveyance direction beyond an allowable limit, and consequently, one end portion of the fitting protrusion bottom portion 4 in the uppermost container 1a in the Y direction rides on one end portion of the opening portion 5 in the middle container 1b in the Y direction, with the result that the container stack 8 is in an abnormally stacked state. In the container stack 8 shown in FIG. 4B, the middle container 1b properly fitted to the uppermost container 1a is displaced with respect to the lowermost container 1c in the Y direction parallel to the conveyance direction beyond the allowable limit, and consequently, one end portion of the fitting protrusion bottom portion 4 in the middle container 1b in the Y direction rides on one end portion of the opening portion 5 in the lowermost container 1c in the Y direction, with the result that the container stack 8 is in an abnormally stacked state.

Next, description will be given of calculation processing in the calculation processing means 18 which is performed after the code display surfaces 6 of the respective containers 1a to 1c in the container stacks 8 in the respective states shown in FIGS. 3A to 4B are read by the code reading means 12 (code reader 15) with reference to FIGS. 5 to 8. The calculation processing means 18 reads, based on the image data acquired from the code reading means 12, the specific numbers of the respective containers 1a to 1c in the container stack 8, here, the specific number of the uppermost container 1a=ABC001, the specific number of the middle container 1b=ABC002, and the specific number of the lowermost container 1c=ABC003, and simultaneously reads the position coordinate values of fixed points A to D in the four corners of the code display surfaces 6 in the respective containers 1a to 1c. The position coordinate values of the fixed points A to D are the X-Y coordinate values of the fixed points A to in the four corners of each code display surface 6 within the image capturing area 15a when one corner portion (although any one may be adopted, in the illustrated example, the corner portion in the upper right corner) within the four corners of the image capturing area 15a in the code reader 15 is assumed to be a reference point P0, the X axis coordinate value is increased vertically downward from the reference point P0 and the Y axis coordinate value is increased horizontally leftward from the reference point P0.

Figures 5A, 5B:
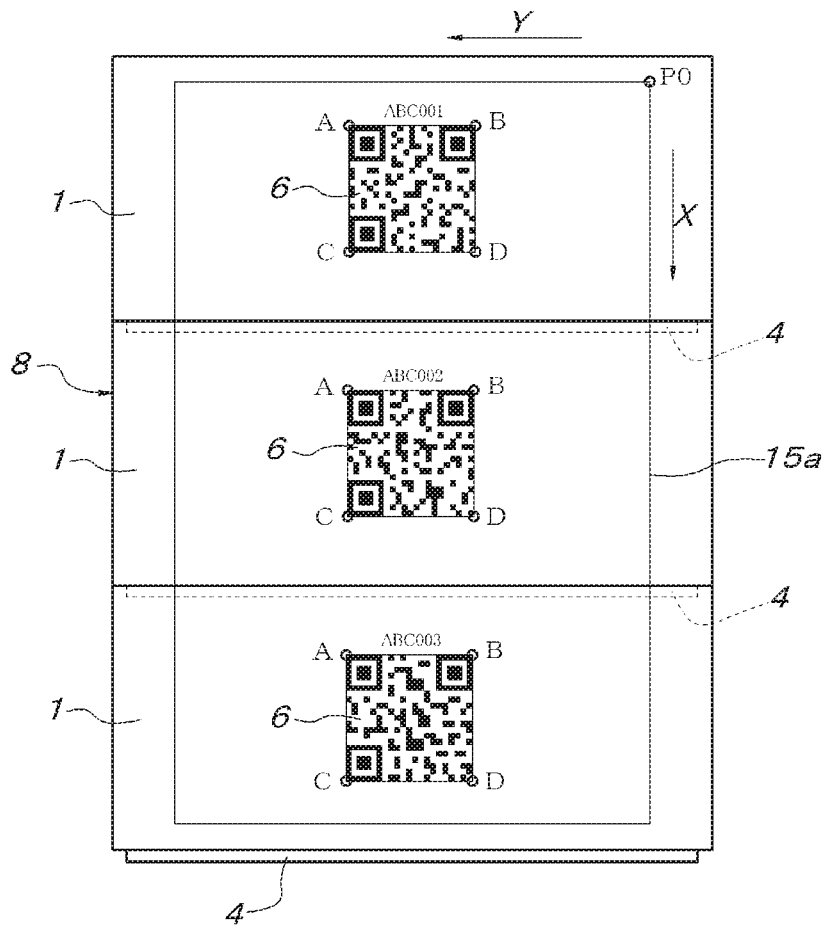
FIG. 5A is a side view schematically showing respective code display surfaces and an image capturing area in the container stack shown in FIG. 3A.
FIG. 5B is a numerical table showing the results of reading of the respective code display surfaces shown in FIG. 5A.
Figures 6A, 6B:
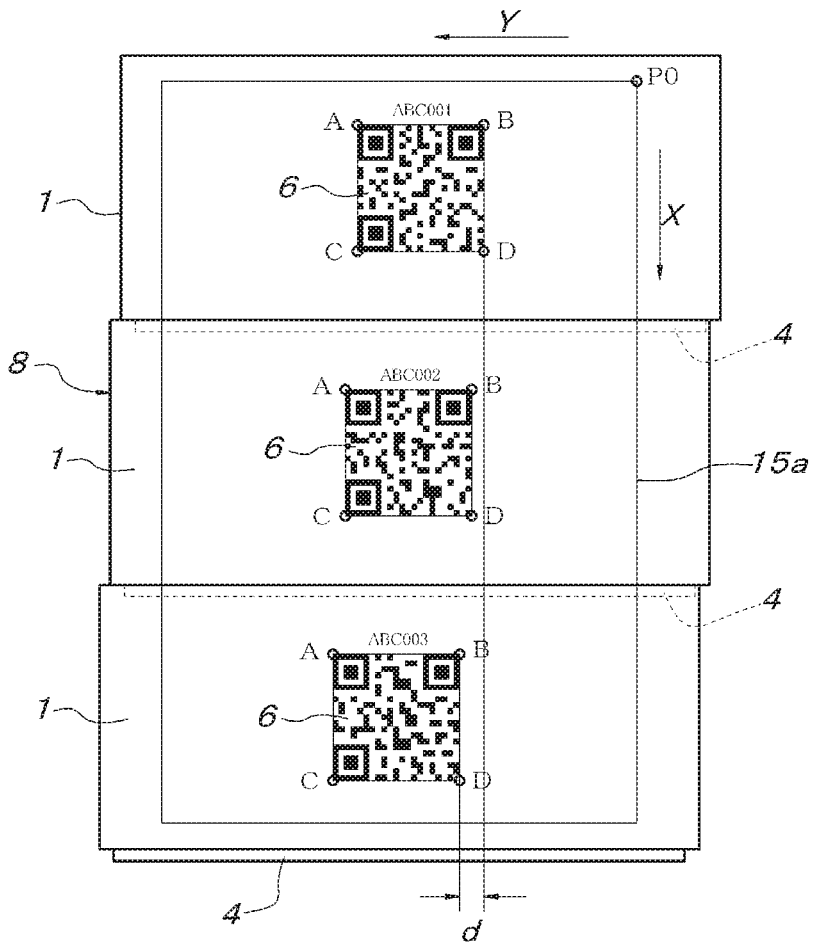
FIG. 6A is a side view schematically showing respective code display surfaces and an image capturing area in the container stack shown in FIG. 3B.
FIG. 6B is a numerical table showing the results of reading of the respective code display surfaces shown in FIG. 6A.

Even in the container stack 8 in the properly stacked state shown in FIG. 3A (FIG. 5A), as indicated in the numerical table of FIG. 5B, errors are recognized in the Y coordinate values of the point A and the point C and the Y coordinate values of the point B and the point D which should be the same value in theory, and this is caused by the play in the Y direction between the fitting protrusion bottom portion 4 in the upper container and the opening portion 5 in the lower container, as well as caused by errors in the precision of the production of the respective containers or an error in the sticking position of the label 7 and the like. Here, between the containers 1a and 1b and between the containers 1b and 1c which are vertically adjacent to each other, a displacement of 13 (pixel/inch) in the Y direction at the maximum is recognized. In the container stack 8 in the stacked state within a proper range shown in FIG. 3B (FIG. 6A), between the containers 1a and 1b and between the containers 1b and 1c which are vertically adjacent to each other, a displacement of 23 (pixel/inch) in the Y direction at the maximum is recognized. In other words, when the maximum positional displacement amount d in the Y direction between the containers 1a and 1b and between the containers 1b and 1c which are vertically adjacent to each other is, for example, equal to or less than 30 (pixel/inch), the stacked state can be determined to be the properly stacked state. An inclination angle θ shown in each numerical table is an inclination angle shown in each code display surface 6, and the value of the inclination angle θ shown in the illustrated numerical table is the angle of a line segment between the point A and the point B (or the point C and the point D) in the code display surface 6 in a counterclockwise direction when viewed from the point B (or the point D) close to the reference point P0. The value of the inclination angle θ is calculated based on a difference in the X coordinate value between the point A and the point B (or the point C and the point D), an interval in the Y direction between the point A and the point B (or the point C and the point D) and the camera resolution of the code reader 15. In the examples of FIGS. 5 and 6, the inclination angle θ is 271 degrees. As a matter of course, the inclination angle θ of the code display surface as described above may be detected as an inclination angle of a line segment between the point A and the point C (or the point B and the point D) in the code display surface 6.

Figure 4A:
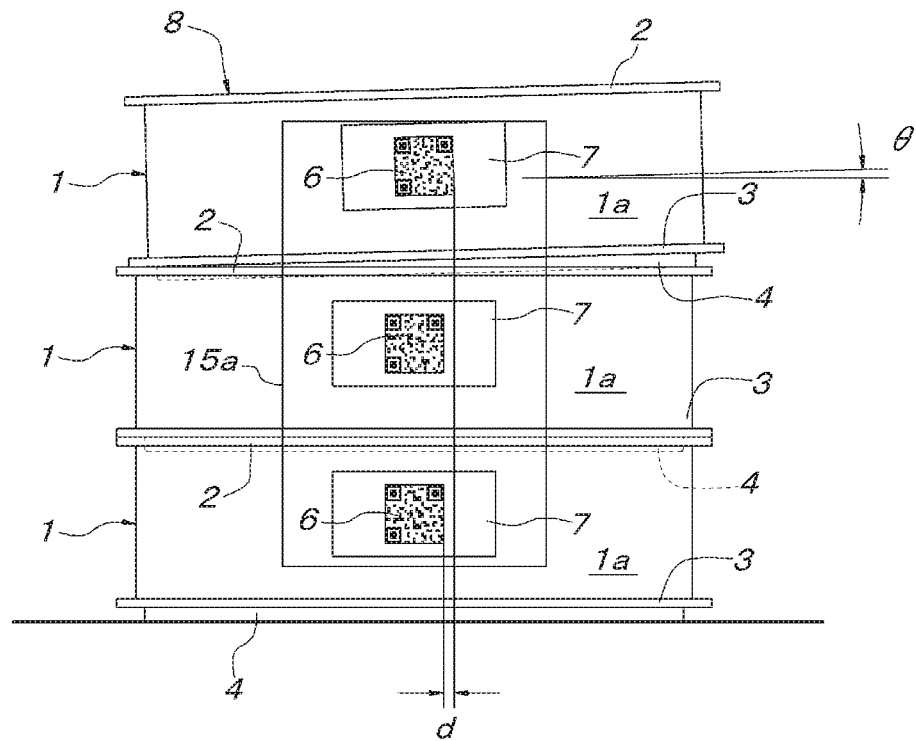
FIG. 4A is a side view showing a state where the uppermost container in the container stack shown in FIG. 3A is not properly fitted.
Figure 4B:
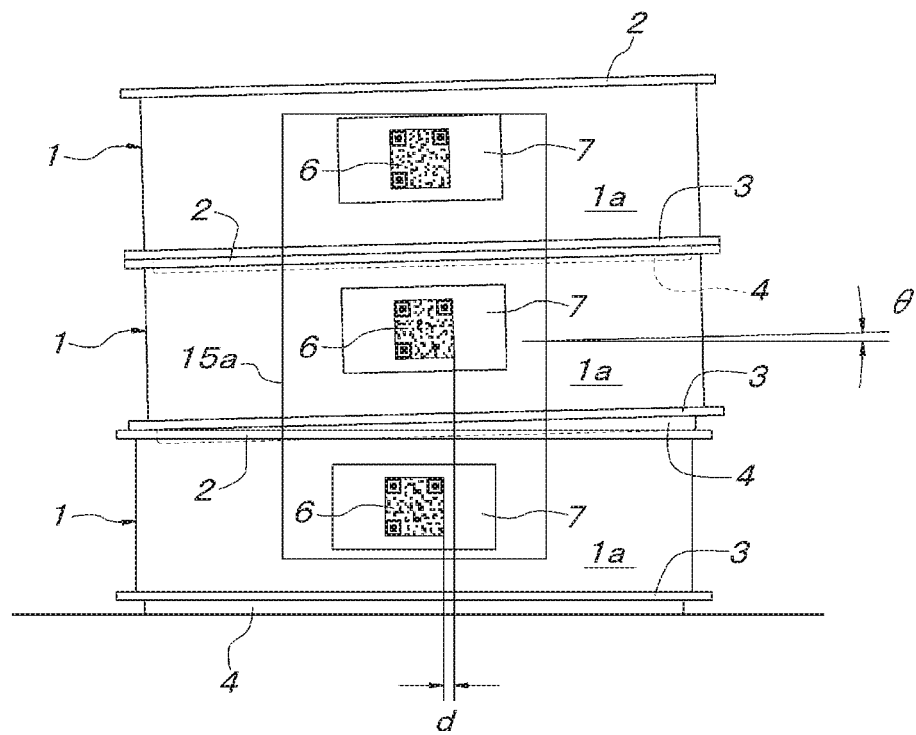
FIG. 4B is a side view showing a state where the middle container in the container stack shown in FIG. 3A is not properly fitted with respect to the lowermost container.
Figures 7A, 7B:
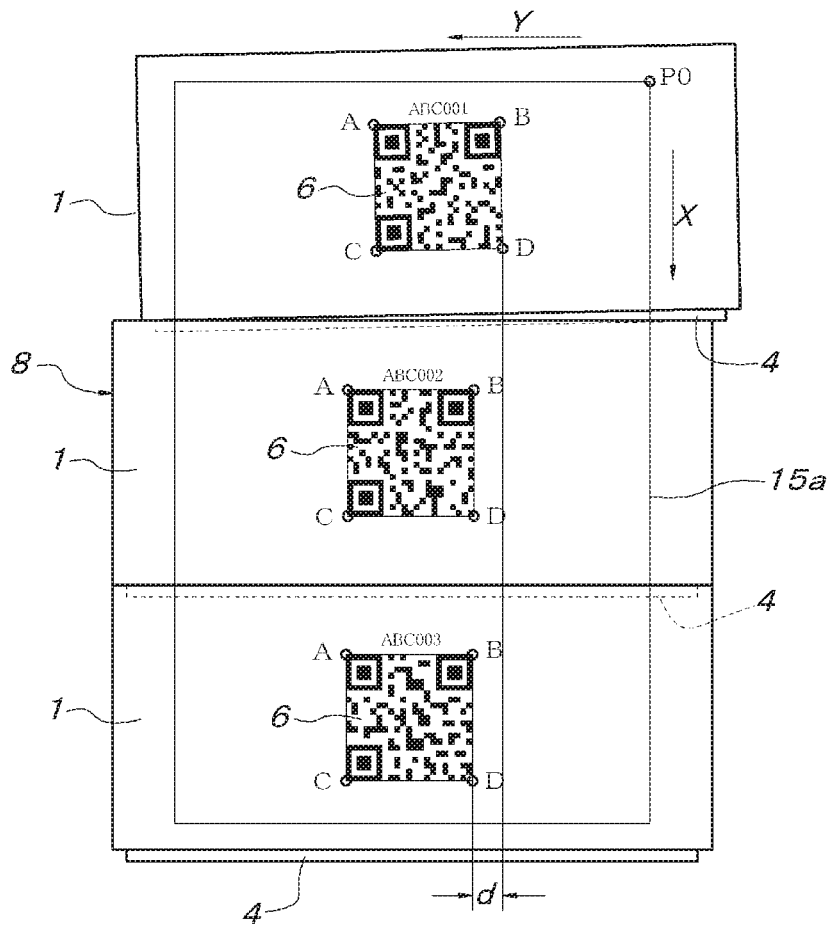
FIG. 7A is a side view schematically showing respective code display surfaces and an image capturing area in the container stack shown in FIG. 4A.
FIG. 7B is a numerical table showing the results of reading of the respective code display surfaces shown in FIG. 7A.
Figures 8A, 8B:
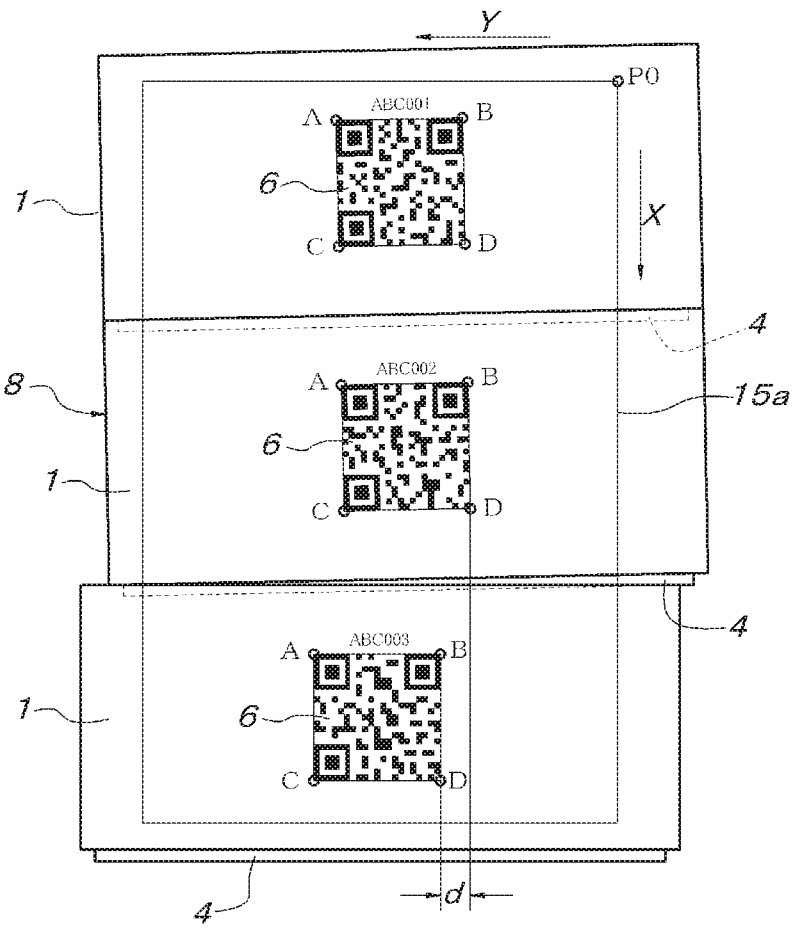
FIG. 8A is a side view schematically showing respective code display surfaces and an image capturing area in the container stack shown in FIG. 4B.
FIG. 8B is a numerical table showing the results of reading of the respective code display surfaces shown in FIG. 8A.

In the container stacks 8 in the abnormally stacked states shown in FIG. 4A (FIG. 7A) and FIG. 4B (FIG. 8A), as indicated in the numerical tables shown in FIGS. 7B and 8B, the maximum positional displacement amounts d in the Y direction between the two containers 1a and 1b and between the two containers 1b and 1c which are vertically adjacent to each other are respectively 57 (pixel/inch) and 60 (pixel/inch), and, as described previously, when the allowable limit for the Y direction positional displacement amount d is set to 30 (pixel inch), the container stacks 8 shown in FIG. 4A (FIG. 7A) and FIG. 4B (FIG. 8A) can be determined to be in the abnormally stacked state. In addition, in the container stacks 8 shown in FIG. 4A (FIG. 7A) and FIG. 4B (FIG. 8A), the inclination angle θ of the code display surface 6 differs from the inclination angles θ of the other code display surfaces 6 only by 2 degrees. Therefore, if it can be assumed that there is almost no variation in the sticking posture of the labels 7, and the label 7s are stuck correctly horizontally, in a case where the error in the inclination angle θ of the code display surface 6 is, for example, equal to or more than 2 degrees, the container stack can also be determined to be in the abnormally stacked state.

That is, when the image data within the image capturing areas 15a including the code display surfaces 6 in the respective containers 1a to 1c is read by the code reader 15 (step S2 in the flowchart of FIG. 9), the calculation processing means 18 which has received the code reading signal 19c analyzes the image data so as to detect the coordinate values of the points A to D in the respective code display surfaces 6 (step S3 in the flowchart of FIG. 9) and calculates the positional displacement amount in the Y direction based on the coordinate values of the points A to D (step S4 in the flowchart of FIG. 9). Then, it is determined whether or not the positional displacement amount in the Y direction falls within the allowable range (step S5 in the flowchart of FIG. 9), and when the positional displacement amount falls within the allowable range, as shown in FIG. 2A, the calculation processing means 18 transmits a restart signal 19e to the drive means 17 for the roller conveyor 9 so as to restart the roller conveyor 9, and feeds out the container stack 8 which has been stopped at the fixed stop position 13 (step S6 in the flowchart of FIG. 9). When, in step S5 described above, it is determined that the displacement amount in the Y direction exceeds the allowable range, as shown in FIG. 2A, the calculation processing means 18 detects a stacking abnormality detection signal 19f, therefore, after measures for coping with the stacking abnormality based on the stacking abnormality detection signal 19f (step S7 in the flowchart of FIG. 9) are performed, step S6 described above is performed.

As the measures for coping with the stacking abnormality based on the stacking abnormality detection signal 19f, for example, by activating an alarm to notify a standby operator of a situation or by other means, and the stacked state of the container stack 8 of the stacking abnormality can be corrected manually in a state where the container stack 8 is positioned at the fixed stop position or after the container stack 8 is fed out to a predetermined position by the restart of the roller conveyor 9. As a matter of course, the correction of the stacked state can also be performed by a dedicated automatic machine. It is noted that, instead of step S4 described above, as described previously, in step S3, the coordinate values of the points A to D in the code display surfaces 6 are detected, and thereafter the displacement of the angle of the respective code display surfaces 6 is calculated from the coordinate values of the points A to D (step S8 in the flowchart of FIG. 9), with the result that it is also possible to determine, in step S5, whether or not the displacement amount of the angle falls within the allowable range.

Figure 2B:
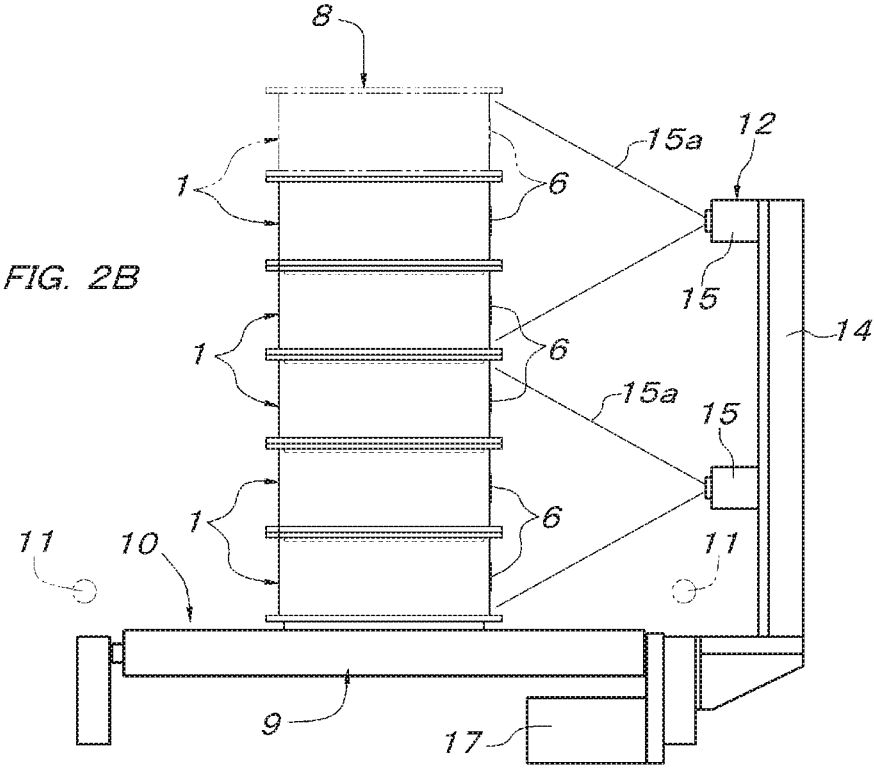
FIG. 2B is a front view showing an embodiment in which the code reading means is formed with two upper and lower code readers.

It is noted that, in a case where the number of containers 1 stacked forming the container stack 8 is large or in a case where the height of the container 1 itself is great and therefore the necessary height of the image capturing area 15a in the code reader 15 is increased, as shown in FIG. 2B, two or more code readers 15 are arranged at appropriate intervals in the up/down direction so as to form the code reading means 12, the image capturing areas 15a in the code readers 15 are collected in the up/down direction and thus it is possible to form the image capturing area whose height is great. Although in the embodiment, in the state where the container stack 8 is once stopped at the fixed stop position 13 on the conveyance path 10, the code display surfaces 6 of the containers 1 of the respective stages in the container stack 8 are read by the code reading means 12, it may be configured such that the code display surfaces 6 of the containers 1 of the respective stages in the container stack 8 that is being moved on the conveyance path 10 (it may also be decelerated) are read by the code reading means 12.

In addition, although the container 1 described in the above-described embodiment has a structure in which, at the time of stacking, the fitting protrusion bottom portion 4 can be fitted into the concave recessed portion such as the rectangular opening portion 5 in the lower container, as the container to which the present invention can be applied, as long as containers are stackable (including containers which can be folded when they are not used), the structure and material of the containers, such as those having a flat bottom surface without having the fitting protrusion bottom portion 4, are not limited.

INDUSTRIAL APPLICABILITY

The abnormality detection device for a container stack according to the present invention can be utilized as a means for sorting, in a case where a container stack in which a plurality of containers are stacked is conveyed to, for example, a storage area, a container stack which is not properly stacked.

What is claimed is:
1. An abnormality detection device for a container stack, comprising:
   the abnormality detection device being operable to determine a stacking abnormality in the container stack on a lateral side of a conveyance path;
   the container stack including a plurality of containers, each container having a code display surface recording container information, the code display surface being provided in a fixed position on a lateral outer surface of the stackable container, and the plurality of containers are stacked such that the code display surfaces are positioned on a same side, and where the container stack is conveyed with the code display surfaces oriented parallel to a conveyance direction;
   a code reading means operable to captures images of the code display surfaces on the respective containers in the container stack is arranged on the lateral side of the conveyance path;
   a calculation processing means operable to read data input from the code reading means;
   the calculation processing means being operable to detect, from the read data of each of the code display surfaces, a position coordinate value of at least one fixed point in each of the code display surfaces; and
   the calculation processing means being operable to determine the stacking abnormality in the container stack from the position coordinate value of each of the containers.

2. The abnormality detection device for a container stack according to claim 1, wherein:
   the calculation processing means calculates, from the position coordinate value of the one fixed point in the code display surface in each of the containers, a positional displacement amount between the respective containers in the conveyance direction;
   the calculation processing means calculates whether or not the positional displacement amount falls within an allowable range; and
   the calculation processing means determines the stacking abnormality when the positional displacement amount exceeds the allowable range.

3. The abnormality detection device for a container stack according to claim 1, wherein:
   the calculation processing means calculates, from position coordinate values of two fixed points in the code display surface in each of the containers a fixed distance away in the conveyance direction, an inclination angle of each of the containers with respect to the conveyance direction;
   the calculation processing means calculates, from the inclination angle of each of the containers, an inclination angle displacement amount between the respective containers; and the calculation processing means determines the stacking abnormality when the inclination angle displacement amount exceeds an allowable range.

4. The abnormality detection device for a container stack according to claim 1, wherein from the read data of the code display surface whose image is captured by the code reading means, a corner of the code display surface is set to the fixed point, and the position coordinate value thereof is detected.

5. The abnormality detection device for a container stack according to claim 1, wherein:
    the container stack which is conveyed on the conveyance path is temporarily stopped in a position where all the code display surfaces in the container stack are present within an image capturing area of the code reading means; and
    for the container stack in a stopped state, the images of the code display surfaces are captured by the code reading means.

6. The abnormality detection device for a container stack according to claim 1, wherein the code reading means is formed by providing code readers capable of reading the code display surface of one container or the code display surfaces of a plurality of the containers stacked in a plurality of vertical stages.

7. The abnormality detection device for a container stack according to claim 2, wherein from the read data of the code display surface whose image is captured by the code reading means, a corner of the code display surface is set to the fixed point, and the position coordinate value thereof is detected.

8. The abnormality detection device for a container stack according to claim 2, wherein:
    the container stack which is conveyed on the conveyance path is temporarily stopped in a position where all the code display surfaces in the container stack are present within an image capturing area of the code reading means; and
    for the container stack in a stopped state, the images of the code display surfaces are captured by the code reading means.

9. The abnormality detection device for a container stack according to claim 2, wherein the code reading means is formed by providing code readers capable of reading the code display surface of one container or the code display surfaces of a plurality of the containers stacked in a plurality of vertical stages.

\* \* \* \* \*